Aug. 14, 1923.
R. LIEBAU
SHOCK ABSORBER
Filed March 11, 1922
1,464,574
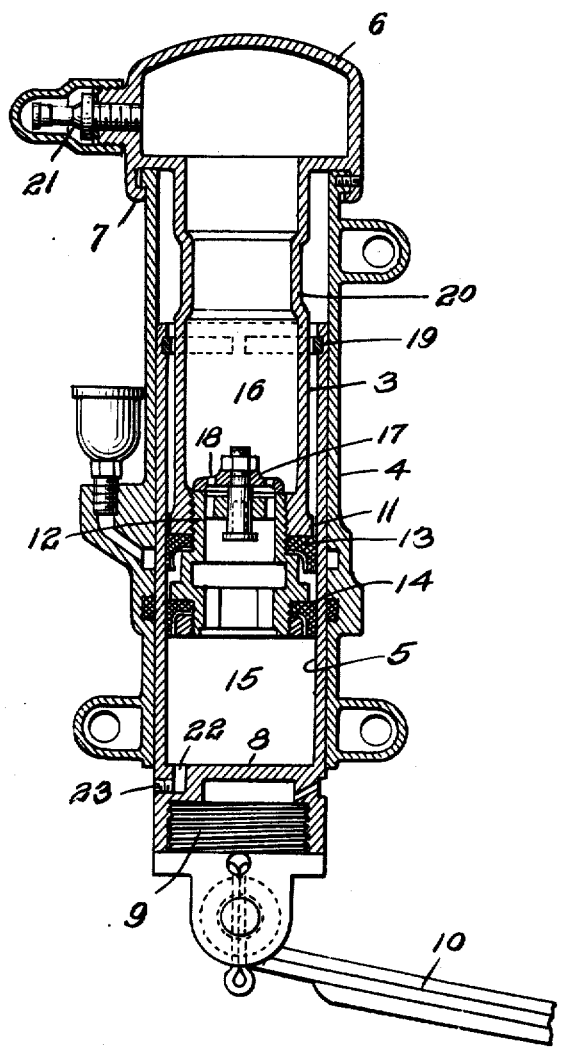
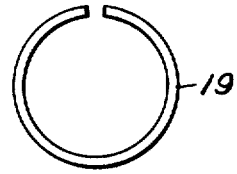
WITNESSES
INVENTOR
Richard Liebau
By Green and McCallister
His Attorneys.

Patented Aug. 14, 1923.

1,464,574

UNITED STATES PATENT OFFICE.

RICHARD LIEBAU, OF NEW HAVEN, CONNECTICUT.

SHOCK ABSORBER.

Application filed March 11, 1922. Serial No. 543,073.

*To all whom it may concern:*

Be it known that I, RICHARD LIEBAU, a citizen of the United States of America, residing at New Haven, in the county of New Haven and State of Connecticut, have invented certain new and useful Improvements in Shock Absorbers; and I do hereby declare the following to be a full, clear, and exact description of the invention, such as will enable others skilled in the art to which it appertains to make and use the same.

This invention relates to vehicle air springs (sometimes called shock absorbers) of the type in which telescoping cylinder-like members form a cushion chamber of variable volumetric capacity.

Air springs are now usually installed so as to operate in series with the steel springs of the vehicle.

In air springs of this type the cushion chamber is charged with a certain amount of oil or other lubricating liquid and with a sufficient amount of air under pressure to normally hold the spring in about mid position when supporting its load.

During operation in service the volumetric capacity of the cushion chamber of each spring varies during its compression and extension movements.

In air springs of this type, it is necessary and therefore, customary to provide means for preventing the telescoping members from getting out of telescoping engagement upon extreme extension movements.

An object of this invention is to produce a simple, relatively cheap device which is capable of performing all of the functions necessary to a successful vehicle air spring.

Another object is to simplify the construction and assembly of vehicle air springs of this type.

A further object of this invention is to produce an air spring of the telescoping cylinder type which has a relatively long guiding surface as compared to its overall length when collapsed.

A still further object is to produce a telescopic air spring in which simple means are provided for limiting its extension movements.

The above, as well as other objects which will readily appear to those skilled in the air spring art, I attain by means of the deivce described in the specification and illustrated in the drawings accompanying and forming part of this application.

In the drawings, Figure 1 is a longitudinal sectional view of an air spring or shock absorber embodying this invention and Fig. 2 is an end view of a snap ring employed in the construction of the device.

The air spring consists of an inner cylindrical member 3 an outer cylindrical member 4 spaced from the inner cylinder and rigidly connected thereto and an intermediate cylinder 5 adapted to slide in the annular space between cylinders 3 and 4.

Cylindrical member 3 is provided with an enlarged hollow head 6 and the outer or guide cylinder 4 is connected to this head by means of an inturned annular flange 7 depending from said head.

Cylindrical member 5 is provided with an integral bottom 8 which is internally threaded to receive the threaded end of a connector 9 by means of which the cylindrical member 5 which is termed the movable member of the air spring is connected to one end of one of the steel springs 10, of the vehicle.

Cylindrical member 3 at its bottom is provided with an outwardly extending annular flange 11 and is internally threaded to receive a sleeve-like valve housing 12. Cup leather packings 13 and 14 are secured in place below the lower end of cylindrical member 3 by means of valve housing 12 and slide on the inner wall of cylindrical member 5 during the compression and extension movements of the device to seal the sliding joint between cylindrical members 3 and 5. The sleeve-like valve housing 12 establishes communication between chamber 15 located below the packings 13 and 14 and the chamber 16 located above the valve housing 12.

A valve disc 17 carried by the valve housing is adapted to be opened during compression movements of the device and to be seated during its extension movements. The valve disc is formed with openings 18 through which the fluid slowly passes into chamber 15 as said chamber increases in volumetric capacity during extension movements of the device.

Cylindrical member 5 near its top is provided with an annular groove within which an elastic snap ring 19 is located. This ring co-operates with annular flange 11 formed on the bottom of cylindrical member 3 to provide means for limiting or checking outward or expansion movements of the air spring.

Cylindrical member 3 is provided with a portion 20 of reduced diameter for assisting in the assembly of split ring 19 within its annular groove. In order to assemble the ring in place, it is placed opposite portion 20 of reduced diameter and compressed. The annular groove in cylindrical member 5 is then moved until it is opposite the compressed ring and the ring is then allowed to expand into the groove. In assembling the device the outer or guard cylinder 4 will be slid into place over cylindrical member 5 after the other parts have been assembled.

An air valve 21 of usual construction is provided for charging the device with oil as well as air. A drain duct 22 closed by means of a plug 23 is provided in bottom 8 for periodically draining the device.

The outer or guard cylinder 4 is adapted to be rigidly connected to the frame or load platform of the vehicle so that the device will operate in series with steel spring 10.

Having thus described my invention, what I claim is:—

In a cushion device, an outer cylindrical member having an internal circumferential groove, a split ring located in said groove and an inner cylindrical member arranged to telescope within the outer member and having a stop adapted to co-operate with said ring to limit the extension movements of the device; said inner member being formed with a portion of reduced diameter for assisting in the assembly of said split ring.

In testimony whereof I hereunto affix my signature in the presence of two witnesses.

RICHARD LIEBAU.

Witnesses:
 Max Hug,
 Willy Hotz.